(12) United States Patent
Taguchi et al.

(10) Patent No.: US 11,271,809 B2
(45) Date of Patent: Mar. 8, 2022

(54) COMPUTER SYSTEM, CONFIGURATION CHANGE CONTROL DEVICE, AND CONFIGURATION CHANGE CONTROL METHOD

(71) Applicant: Hitachi, Ltd., Tokyo (JP)

(72) Inventors: Yuta Taguchi, Tokyo (JP); Nobuyuki Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/213,910

(22) Filed: Mar. 26, 2021

(65) Prior Publication Data

US 2022/0038339 A1    Feb. 3, 2022

(30) Foreign Application Priority Data

Jul. 30, 2020  (JP) .............................. JP2020-129521

(51) Int. Cl.
| | |
|---|---|
| *G06F 15/177* | (2006.01) |
| *H04L 41/0816* | (2022.01) |
| *H04L 67/1097* | (2022.01) |
| *H04L 7/00* | (2006.01) |
| *H04L 41/069* | (2022.01) |

(52) U.S. Cl.
CPC ........ *H04L 41/0816* (2013.01); *H04L 7/0008* (2013.01); *H04L 41/069* (2013.01); *H04L 67/1097* (2013.01)

(58) Field of Classification Search
CPC ............ H04L 41/0816; H04L 67/1097; H04L 41/069; H04L 7/0008
See application file for complete search history.

(56) References Cited

U.S. PATENT DOCUMENTS

| | | | |
|---|---|---|---|
| 8,005,888 B2 | 8/2011 | Lamport | |
| 2004/0205372 A1* | 10/2004 | Moser | G06F 11/2038 714/1 |
| 2006/0069942 A1* | 3/2006 | Brasilerio | G06F 9/52 714/4.1 |

* cited by examiner

*Primary Examiner* — Cheikh T Ndiaye
(74) *Attorney, Agent, or Firm* — Procopio, Cory, Hargreaves & Savitch LLP

(57) ABSTRACT

Upon receiving an input of data, an input unit transmits a time notification to another input unit and transmits a data notification including the input clock time to a storage unit. Upon receiving a time notification from another input unit, the input unit transmits an empty notification including the input clock time to the storage unit to indicate there is no input before the input clock time. Upon receiving the data notification from an input unit having received the input of data and receiving the notification from the other input unit, the storage unit broadcasts the data in order, assuming that consensus of the plurality of storage units is confirmed. When adding an input unit to a computer system, a control device causes the storage unit to start confirming the consensus including the joining input unit after a window interval has elapsed after the joining input unit starts operation.

10 Claims, 8 Drawing Sheets

FIG. 7

| Item name | Arrangement representation | | | | | | | |
|---|---|---|---|---|---|---|---|---|
| Broadcast order | 1 | 2 | 3 | 4 | 5 | 6 | 7 | 8 |
| Data from P1 | e | e | R | e | M4 | M5 | e | e |
| Data from P2 | e | e | e | e | e | e | e | M7 |
| ... | ... | | | | | | | |
| Data from PN | M1 | M2 | e | M3 | e | e | e | e |
| Data from P_Jo | - | - | (e) | (e) | (e) | (e) | M6 | e |
| W | - | - | 3 | 2 | 1 | 0 | - | - |
| Row add flag | 0 | 0 | 1 | 0 | 0 | 0 | 0 | 0 |
| Availability of broadcast | Yes | Yes | Yes | Yes | Yes | Yes | Yes | No |

COMPUTER SYSTEM, CONFIGURATION CHANGE CONTROL DEVICE, AND CONFIGURATION CHANGE CONTROL METHOD

BACKGROUND

The present disclosure relates to a technique for changing a configuration during operation of a distributed system that performs total order broadcast.

A distributed system is a computer system that secures availability by multiplexing data with a plurality of devices and switching the processing of a failed device to another device. When adding a new device to the distributed system or returning a device that has been disconnected due to a failure to the distributed system, it is necessary to change the system configuration of the distributed system. When changing the system configuration of a distributed system, it is common to temporarily stop the execution of processing in the entire distributed system.

However, in recent years, the number of processes executed per unit time period has been increasing due to the improvement of the hardware performance of computers. Therefore, when the execution of processing is stopped to change the configuration of a computer system, the loss caused by the delay of the process during that period also increases. For example, in the field of securities trading, since the temporal order in which each process including transaction is executed is important, and that the number of processing transactions is directly linked to profits, it is desirable that there is little delay in processing. Therefore, in the computer system, it is necessary to execute processes in the order of occurrence clock time (chronological order processing), to change the configuration without stopping the execution of the processing, and to minimize the delay therebetween (high availability).

As a technique for realizing chronological order processing and high availability, total order broadcast which is one of the distributed consensuses is known (see U.S. Pat. No. 8,005,888 B2). In total order broadcast, for example, in a distributed system having a plurality of client devices and a plurality of server devices, when data from a user is input to a certain client device, the client device sends a notification of the clock time at which the input is received. In addition, the client device sends data to each server device together with the clock time information. Each server device temporarily stores the received data. Another client device that has received the clock time notification sends state information to each server device that no data has been input to the other client device before the notified clock time. In each server device, state information from other client devices is stored together with data from the client device to which the data from the user has been input. Each server device confirms that the order based on the consensus of all client devices is guaranteed once the data and state information from all client devices are available.

SUMMARY

As described above, the system configuration may be changed even in a distributed system that performs total order broadcast. Even in a distributed system that performs total order broadcast, it is still desirable that processing is not stopped and the order of processing is secured when the configuration is changed. However, it is difficult to completely synchronize the operation of a client device (an input unit) on the side that inputs data and the operation of a server device (a storage unit) on the side that stores the input data and confirms the consensus of all client devices, and the state of the input unit and the state of the storage unit may not match. Due to such a state inconsistency, the storage unit may wait for state information that should not come from the input unit, and processing may be delayed in the meantime. In addition, due to the state inconsistency, the storage unit having recognized that the data and state information from all the input units are not available although they are available may activate a retransmission procedure, and the processing may be delayed while the retransmission procedure is running.

As described above, there is a problem that it is not easy to change the configuration promptly while continuing the operation in the distributed system of total order broadcast.

One object of the present disclosure is to provide a technique for promptly changing the configuration of a distributed system that performs total order broadcast.

A computer system according to an aspect of the present disclosure is a computer system that performs total order broadcast, including: one or more input units configured to receive input of data and measure an input clock time at which the input of the data is received; a plurality of storage units configured to receive the data from the input units and broadcast the data to a predetermined processing device in the order of the input clock time; and a configuration change control device configured to control configuration change of the computer system, for adding an input unit to the computer system, wherein upon receiving the input of the data, the input unit transmits a clock time notification including the input clock time to another input unit and transmits a data notification including the data and the input clock time to the storage unit, and upon receiving the clock time notification of an input clock time from another input unit, the input unit transmits an empty notification including the input clock time to the storage unit, indicating that there is no input to the input unit at a clock time earlier than the input clock time, upon receiving the data notification from an input unit having received the input of the data and receiving the empty notification from the other input unit, the storage unit broadcasts the data in the order of the input clock time, assuming that consensus of the plurality of storage units can be confirmed, and when performing configuration change for adding an input unit to the computer system, the configuration change control device causes the storage unit to start confirming the consensus including a joining input unit after a window interval of a predetermined time period has elapsed after the joining input unit which is an input unit to be added in the configuration change starts operation.

According to one aspect of the present disclosure, in a broadcasted system that performs total order broadcast, it is possible to suppress a long waiting time period due to a state inconsistency and the activation of a retransmission procedure, and promptly execute the configuration change while continuing processing.

BRIEF DESCRIPTION OF THE DRAWINGS

FIG. 7 is a diagram for explaining an operation example of changing the configuration of a total order broadcast system.

DETAILED DESCRIPTION OF THE EMBODIMENT

Hereinafter, an example of total order broadcast will be described with reference to the drawings.

First Embodiment

Figure 1:
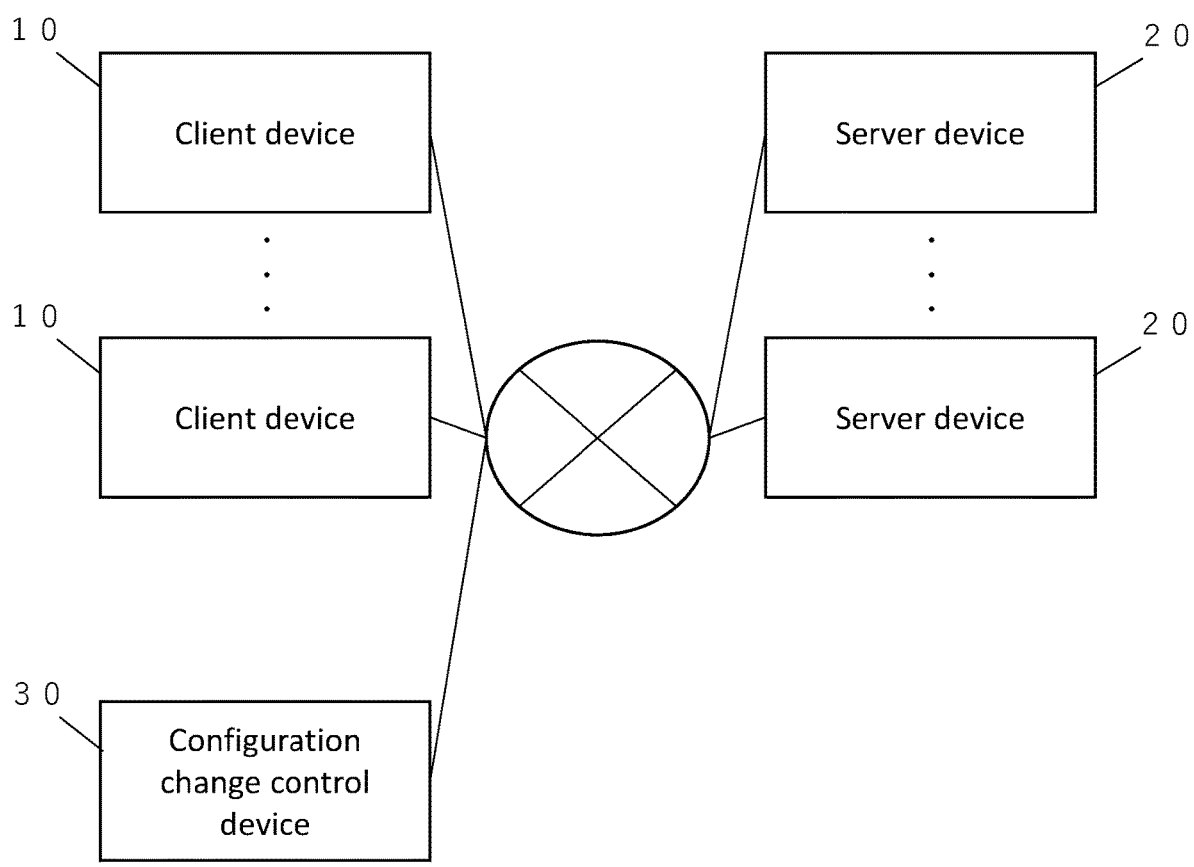
FIG. 1 is a block diagram of a total order broadcast system according to a first embodiment.

FIG. 1 is a block diagram of a total order broadcast system according to a first embodiment.

Referring to FIG. 1, a total order broadcast system includes a client device 10, a server device 20, and a configuration change control device 30.

The client device 10 is an input unit of a system that receives the input of data and measures the input clock time at which the data input is received. In the first embodiment, one or more client devices 10 are present in the total order broadcast system.

The server device 20 is a storage unit of a system that receives data from the client device 10 which is an input unit of the system and broadcasts the data to a predetermined processing device in the order of the input clock time. In the first embodiment, a plurality of server devices 20 is present in the total order broadcast system.

The configuration change control device 30 is a device that controls the change of the configuration of the total order broadcast system. As an example of the configuration change, a client device 10 which is an input unit may be added to the total order broadcast system.

When the client device 10 receives the input of data, the client device 10 sends a clock time notification including the input clock time to the other client devices 10, and sends a data notification including the data and the input clock time to the plurality of server devices 20. The client device 10 may receive a clock time notification including an input clock time from another client device 10 that has received data input. When the client device 10 receives a time notification from another client device 10, the client device 10 confirms that there is no input to the client device 10 at a clock time earlier than the input clock time, and sends an empty notification to the plurality of server devices 20, indicating that there is no input. The empty notification does not include data, but includes information about the input clock time. Here, the notification is referred to as an empty notification because it does not contain data.

When the server device 20 receives a data notification from the client device 10 that has received the data input and receives an empty notification from all the other client devices 10, the server device 20 broadcasts the data in the order of the input clock time, assuming that the consensus of the plurality of server devices 20 has been confirmed. In this way, the order according to the input clock time is maintained, and the broadcast is performed under the consensus of all the server devices 20. As a result, data is broadcasted in the same content and the same order in all the server devices 20.

In the configuration change of adding the client device 10 to the total order broadcast system, the added client device 10 will be referred to as a joining client device. When performing a configuration change such as adding the client device 10 to the total order broadcast system, the configuration change control device 30 does not allow the server device 20 to start confirming the consensus including the joining client device 10 immediately after the joining client device 10 starts operating. In that state, the joining client device 10 has started operation, but the server device 20 confirms the consensus only with the existing client device 10 that does not include the joining client device 10. That is, the server device 20 assumes that the consensus of the plurality of server devices 20 can be confirmed when the data notifications and the empty notifications from all the existing client devices 10 are available regardless of whether there is an empty notification from the joining client device 10. The configuration change control device 30 performs control so that the server device 20 starts confirming the consensus including the joining client device 10 after a window interval of a predetermined time period has elapsed. When the window interval elapses, the server device 20 starts the operation of determining that the consensus of the plurality of server devices 20 can be confirmed when the data notifications and the empty notifications from all the client devices 10 including the existing client devices 10 and the joining client device 10 are available.

As described above, in the present embodiment, in a total order broadcast system which includes one or more client devices 10 and a plurality of server devices 20 and in which the plurality of server devices 20 confirms the consensus between the plurality of server devices 20 on the basis of the notifications from all client devices 10, when the joining client device 10 is added by the configuration change, the server device 20 starts the operation based on the changed configuration after the window interval elapses after the joining client device 10 starts operating. Therefore, in the total order broadcast system, it is possible to suppress a long waiting time period due to a state inconsistency and the activation of a retransmission procedure, and promptly execute the configuration change while continuing the data broadcast process.

Figure 2:
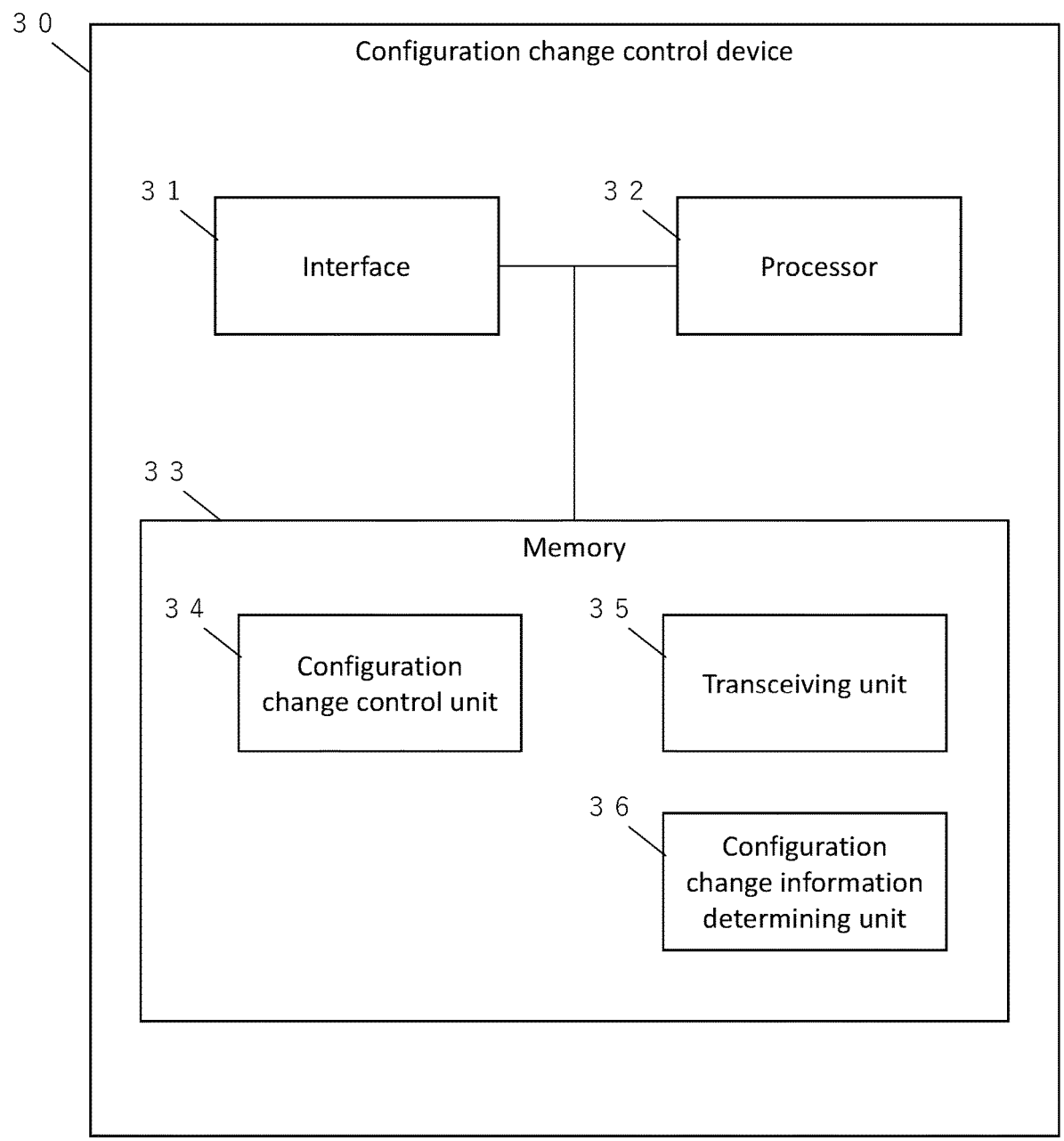
FIG. 2 is a block diagram of a configuration change control device.

FIG. 2 is a block diagram of the configuration change control device.

Referring to FIG. 2, the configuration change control device 30 includes an interface 31, a processor 32, and a memory 33. The memory 33 stores data so that it can be written and read. The memory 33 stores a software program and data used for executing the software program. The memory 33 stores a configuration change control unit 34, a transceiving unit 35, and a configuration change information determining unit 36 as the software program.

The interface 31 includes a communication device that communicates with an external device, an input device such as a keyboard or a mouse that receives information input by an operator, and a display device that displays image or text information on a display screen as the software program is executed.

The processor 32 is a processor that executes processing of the software program using the memory 33. The processor 32 executes the software processing of the configuration change control unit 34, the transceiving unit 35, and the configuration change information determining unit 36.

The configuration change information determining unit 36 determines the information used for controlling the configuration change. The information used for controlling the configuration change includes the time period information of the window interval. The configuration change information determining unit 36 stores in advance history information that records the time period required until the consensus on data is confirmed by the server device 20 after the data is input to the client device 10 when the data is total-order-broadcasted in the past. The configuration change information determining unit 36 determines a suitable window interval time period on the basis of the history information. Then, the configuration change information determining unit 36 transmits the window interval time period to each server device 20. The server device 20 stores the received window interval time period information and uses the time period when the joining client device 10 is added to the total order broadcast system. The window interval can be set such that the inconsistency between the states of the client device 10 and the server device 20 can be suppressed, and a long waiting time period and the activation of the retransmission procedure due to the state inconsistency can be suppressed. Specifically, for example, the time period as short as possible that satisfies the condition that the process of confirming the consensus of the server devices 20 is completed with a predetermined probability or higher may be calculated by statistical calculation and be determined as the time period of the window interval. Alternatively, the longest time period required until the consensus on the data is confirmed by the server device 20 after the data is input to the client device 10 may be extracted from the history information and be determined as the time period of the window interval. In this way, it is possible to suppress the inconsistency between the states of the client device 10 and the server device 20 and execute the configuration change in as short time period as possible.

The configuration change control unit 34 controls the configuration change of adding the joining client device 10 to the total order broadcast system using the information of the window interval determined by the configuration change information determining unit 36.

The transceiving unit 35 transmits and receives a signal related to the configuration change to be exchanged with the client device 10 or the server device 20 in the control of the configuration change by the configuration change control unit 34.

Figure 3:
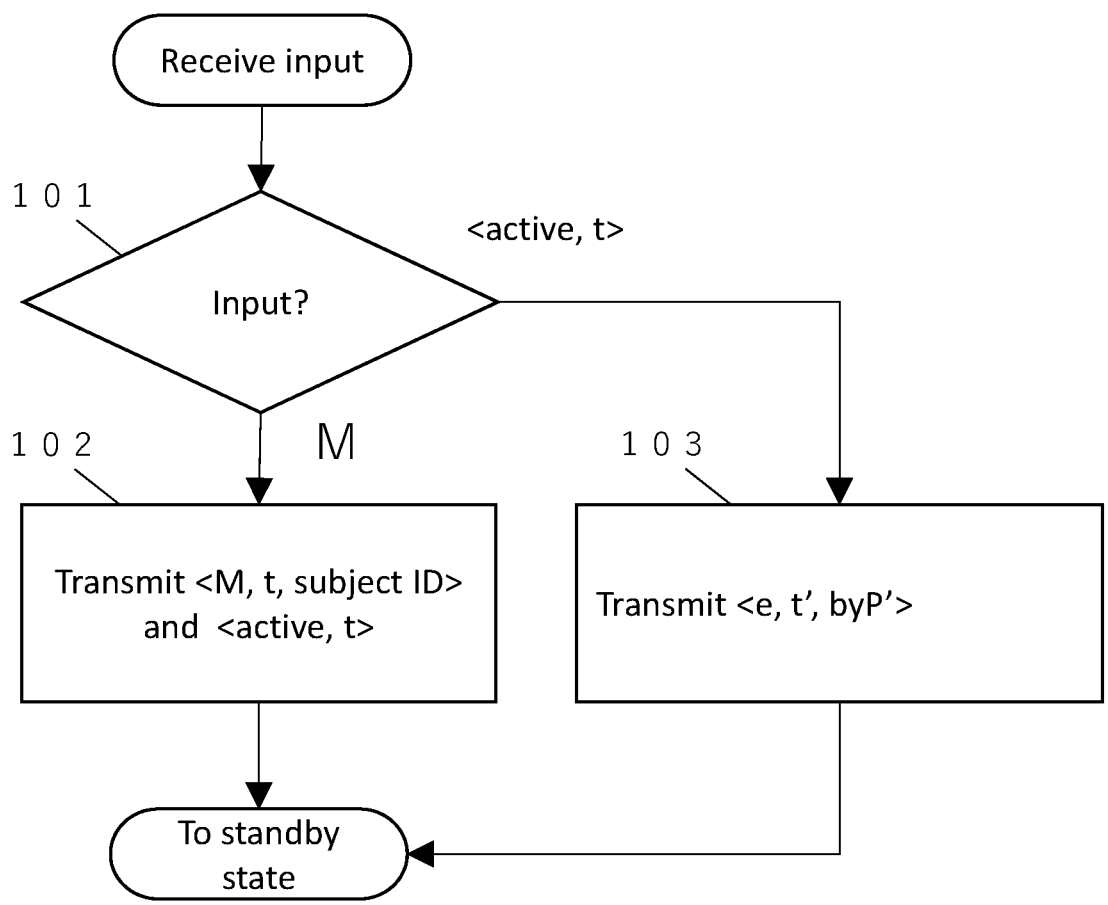
FIG. 3 is a flowchart illustrating the operation of the client device.

FIG. 3 is a flowchart illustrating the operation of the client device. Not only the existing client device 10 included in the total order broadcast system, but also the joining client device 10 that started the operation in the configuration change executes the process illustrated in FIG. 3.

If there is any input, the client device 10 determines in step 101 whether data has been input or an empty notification has been input from another client device 10.

If the input is a data message M, in step 102, the client device 10 transmits a data notification <M, t, subject ID> including the data message M, the input clock time t, and the subject ID with which the subject device can be identified to the plurality of server devices 20 and transmits a clock time notification <active, t> including the input clock time t to the other client devices 10.

If the input is an empty notification <active, t> from another client device 10 in step 101, the client device 10 transmits the input clock time t=t' and an empty notification <e, t', byP'> including the information of the originating client device 10 (P') to the plurality of server devices 20 in step 103.

After step 102 or step 103, the client device 10 proceeds to a standby state to wait for input.

Figure 4:
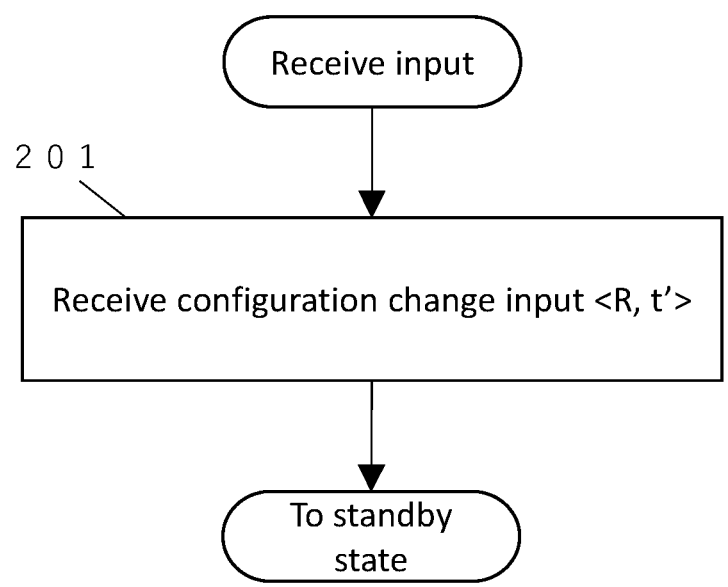
FIG. 4 is a flowchart illustrating an operation when the configuration of the configuration change control device is changed.

FIG. 4 is a flowchart illustrating the operation of the configuration change control device during the configuration change. When a configuration change request for adding the joining client device 10 to the total order broadcast system is input, the configuration change control device 30 transmits a configuration change input <R, t'> to the plurality of server devices 20 in step 201.

Figure 5:
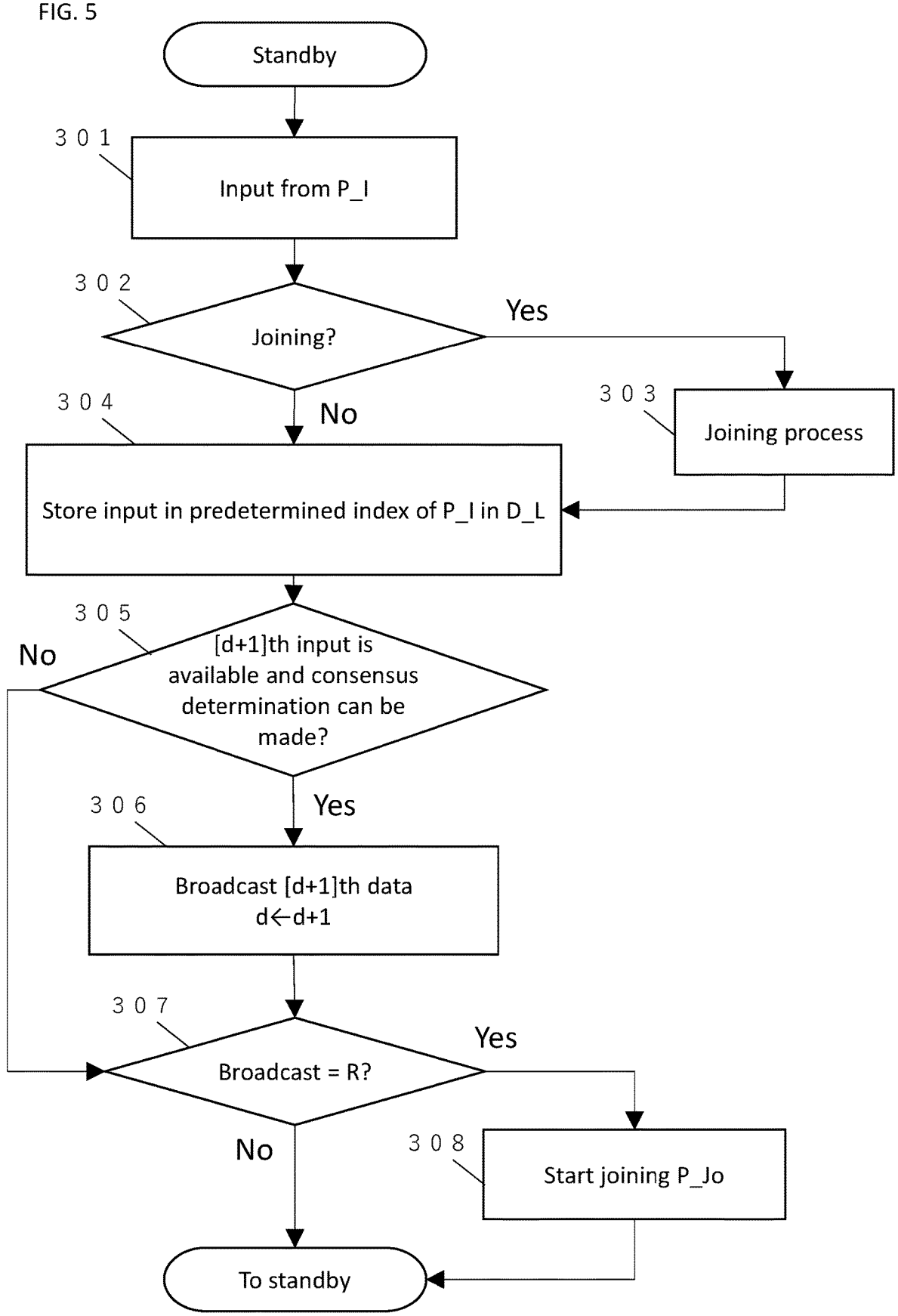
FIG. 5 is a flowchart illustrating the operation of a server device.

FIG. 5 is a flowchart illustrating the operation of the server device.

When there is any input from any device P_In in step 301, the server device 20 in the state of waiting for the input determines in step 302 whether the joining process is currently being executed. The device P_In may be a client device 10 that has received data input, a client device 10 that has received a configuration change request, or a client device 10 that has received a clock time notification from the client device that has received data or configuration change request input. A period in which the joining process is currently being executed is a period until the confirmation of the consensus including the joining client device 10 starts after the configuration change input requesting the configuration change of adding the joining client device 10 is received from the configuration change control device 30. If the joining process is being executed, the server device 20 first completes the joining process in step 303.

When the joining process is not being executed in step 302, or after the joining process is completed in step 303, the server device 20 stores the input received in step 301 in a predetermined index of the device P_In in a consensus determination data matrix D L. The consensus determination data matrix D L is a matrix-shaped storage area in which the input received from the client devices 10 is stored in the corresponding area, and which is used for determining whether the necessary information is available. In the consensus determination data matrix D L, the time direction is a vertical or horizontal direction, the client devices are arranged in a horizontal or vertical direction, and elements are arranged in vertical and horizontal directions. The index is information indicating the input clock time or the order of the input clock time.

Subsequently, in step 305, the server device 20 determines whether the [d+1]th input is available and the consensus determination can be made. d is an index of the data or the configuration change request that has been broadcasted previously. Since the [d+1]th input is used as a target, the order of data and the like in total order broadcast is maintained.

If the [d+1]th input is available and the consensus determination can be made, the server device 20 broadcasts the [d+1]th data or configuration change request in step 306. If the [d+1]th input is not available in step 305, or if the [d+1]th data or configuration change request is broadcasted in step 306, the server device 20 determines in step 307 whether the broadcasted one is the configuration change request R.

If the broadcasted one is the configuration change request R, the server device 20 starts a joining process for joining the joining client device 10 requested to be added to the total order broadcast system in the configuration change request R in step 308. If the broadcasted one is not the configuration change request R in step 307, or after the joining process starts in step 308, the server device 20 proceeds to the standby state to wait for input.

Figure 6:
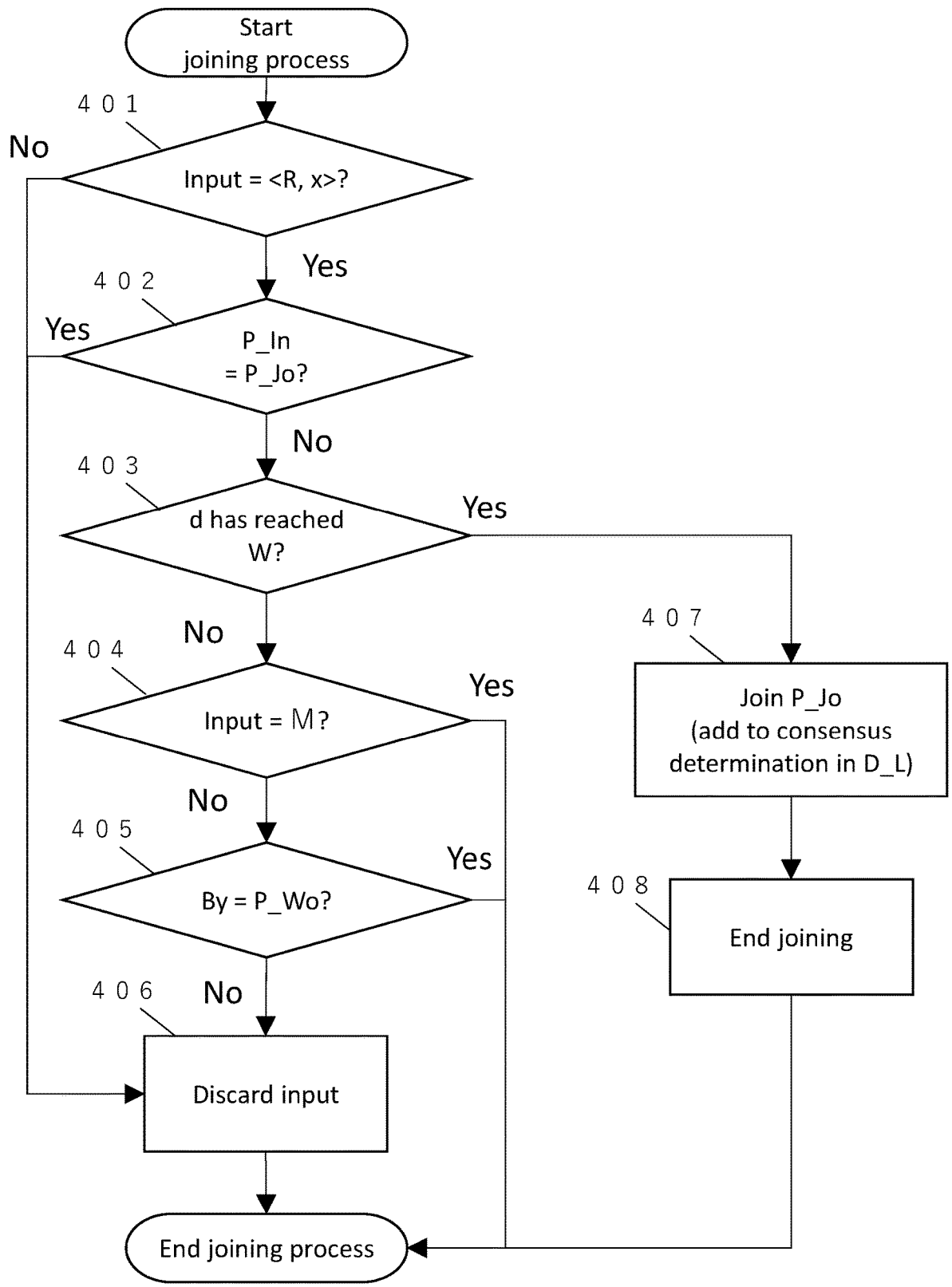
FIG. 6 is a flowchart of a configuration changing process of a server device.

FIG. 6 is a flowchart of the configuration change process of the server device.

The joining process is a process executed when a joining input unit is joined into the total order broadcast system.

In step 401, the server device 20 that has started the joining process determines whether the input to be processed is a configuration change request <R, x>. If the input is the configuration change request <R, x>, the server device 20 determines in step 402 whether the device P_In that issued the input is the joining client device 10. If the device P_In that issued the input is not the joining client device P_Jo, the server device 20 determines in step 403 whether the time elapsed from the d-th input clock time has reached the time W of the window interval.

If the time elapsed from the d-th input clock time has not reached the time W of the window interval, the server device 20 determines in step 404 whether the input is a data message M. If the input is not the data message M, the server device 20 determines in step 405 whether the input originates from the existing client device 10 (P_Wo) that performs a normal operation.

In step 401, if the input is not a configuration change request <R, x>, if the device P_In that issued the input is the joining client device 10, or if the input does not originate from the existing client device 10 (P_Wo) that performs a normal operation, the server device 20 discards the input in step 406.

In step 403, when the time elapsed from the d-th input clock time has reached the time W of the window interval, the server device 20 adds the joining client device 10 (P_Jo) by using the same in the process of confirming the consensus of the plurality of server devices 20 in step 407. Then, in step 408, the server device 20 confirms the end of the joining.

If the input is a data message M in step 404, the input originates from the existing client device 10 (P_Wo) that performs a normal operation in step 405, or after step 406 or step 408, the server device 20 ends the series of joining processes.

As described with reference to FIGS. 3 to 6, in the present embodiment, the configuration change control device 30 inputs a configuration change request for requesting the server device 20 to perform the configuration change to the client device 10. When the client device 10 receives the input of the configuration change request, the client device 10 sends a clock time notification including the input clock time when the configuration change request was received to the other client device 10 in the same manner as when the data is input, and sends a request notification including a configuration change request and input clock time to the server device 20. Further, when the client device 10 receives a clock time notification of the input clock time from another client device 10, the client device 10 sends an empty notification including the input clock time indicating that there is no input to the client device 10 at a clock time earlier than the input clock time to the server device 20. When the server device 20 receives the request notification from the client device 10 that has received the input of the configuration change request and receives the empty notification from the other client device 10, the server device 20 starts confirming the consensus including the joining client device 10 after the window interval has elapsed on the basis of the configuration change request, assuming that the consensus of the plurality of server devices 20 can be confirmed. In this way, since the server device 20 accepts the configuration change request upon confirming the consensus of the plurality of server devices 20 similarly to the data of total order broadcast, it is possible to confirm the consensus of the plurality of server devices 20 and execute adding the joining client device 10.

FIG. 7 is a diagram for explaining an operation example of the configuration change of the total order broadcast system.

In FIG. 7, the broadcast order indicates the order of broadcast of data and the like that should be maintained in total order broadcast. In FIG. 7, the client devices 10 of P1 to PN are incorporated in the total order broadcast system in the initial state. In the broadcast order of 1, a data message Ml is input to the client device 10 of PN. Therefore, a data notification is transmitted from the client device 10 of PN to the server device 20, and an empty notification e is transmitted from the client devices 10 of P1, P2, and the like to the server device 20. In the example of FIG. 7, in the broadcast order of 1, the data notification and the empty notification are available and broadcast can be performed.

In the broadcast order of 3, a configuration change request R for adding the joining client device 10 of P_Jo to the total order broadcast system is input to the client device 10 of P1. Therefore, the configuration change request R is transmitted from the client device 10 of P1 to the server device 20, and the empty notification e is transmitted from the client devices 10 of P2 to PN to the server device 20. In the server device 20, the consensus of the plurality of server devices 20 is confirmed with respect to the configuration change request R, the configuration change request R is broadcasted, and the server device 20 starts the joining process. Here, it is assumed that the time period of the window interval is the time period corresponding to three stages of the broadcast order.

A row corresponding to the joining client device 10 is added to the consensus determination data matrix, but since the elapsed time has not yet reached the time period of the window interval, the server device 20 continues confirming the consensus without including the joining client device 10.

In the broadcast order of 7, a data message M6 is input to the client device 10 of P_Jo. Therefore, the data notification is transmitted from the client device 10 of P_Jo to the server device 20, and the empty notification e is transmitted from the client devices 10 of P1 to PN to the server device 20. Since the elapsed time has reached the time period of the window interval, the server device 20 starts confirming the consensus of the plurality of server devices 20 while including the joining client device 10. Therefore, in the broadcast order of 7, since the data notification and the empty notification are available, it is determined that the broadcast is possible, and the data is broadcasted.

In the present embodiment, the time period information of the window interval determined by the configuration change information determining unit 36 is stored in advance in the server device 20, and the server device 20 uses the stored window interval time period in the configuration change process, but the other configuration may be used. As another example, the configuration change control device 30 may designate the window interval time period in the configuration change request, and the server device 20 may use the window interval time period designated in the configuration change request in the configuration change process.

In that case, the configuration change control device 30 inputs the window interval information to the client device 10 together with the configuration change request. When the client device 10 receives the configuration change request and the window interval, the client device 10 sends the clock time notification including the input clock time when the configuration change request and the window interval are received to the other client device 10, and sends a request notification including the configuration change request, the window interval, and the input clock time to the server device 20. Further, when the clock time notification of the input clock time is received from another client device 10, the client device 10 sends an empty notification including the input clock time indicating that there is no input to the client device 10 at a clock time earlier than the input clock time to the server device 20. When the server device 20 receives the request notification from the client device 10 that has received the configuration change request and the window interval and receives the empty notification from the other client device 10, the server device 20 starts confirming the consensus including the joining client device 10 after the window interval has elapsed on the basis of the configuration change request, assuming that the consensus of the plurality of server devices 20 can be confirmed. According to this, since the server device 20 accepts the configuration change request and the window interval information upon confirming the consensus of the plurality of server devices 20 similarly to the data of total order broadcast, the configuration change control device 30 can designate the window interval and the designated window interval can be matched in the plurality of server devices 20.

Further, in the present embodiment, when the joining client device 10 joins the total order broadcast system and starts operation, the joining client device 10 starts operations including the process of issuing a data notification and the like upon receiving data input, and the process of issuing an empty notification with respect to a clock time notification from the other client device 10, but the other configuration may be used. As another example, when the joining client device 10 joins the total order broadcast system and starts operation, the joining client device 10 may first start a process of issuing an empty notification with respect to a clock time notification from another client device 10 and then starts a process of issuing an empty notification or the like upon receiving the input of data after the time period of the window interval has elapsed.

In that case, when configuration change is executed, the configuration change control device 30 controls the joining client device 10 to start an operation of sending an empty notification of the input clock time indicating there is no input to the joining client device 10 at a clock time earlier than the input clock time to the server device 20 upon receiving the clock time notification of the input clock time from another client device 10 and to start an operation of receiving the input of data when the window interval has elapsed. According to this, since the joining client device 10 starts receiving data input after the server device 20 confirms the consensus including the joining client device 10, broadcast of the data that is received by the joining client device 10 can be started normally.

Second Embodiment

In the first embodiment, the total order broadcast system in which the consensus of the plurality of server devices 20 is confirmed by the individual server device 20 itself has been illustrated, but the other configuration may be used as the total order broadcast system. In the second embodiment, a device for assisting the processing of the server device that confirms the consensus of the plurality of server devices is provided. The total order broadcast system of the second embodiment has the same basic configuration and operation as those of the total order broadcast system of the first embodiment. Hereinafter, differences from the first embodiment of the total order broadcast system of the second embodiment will be mainly described.

Figure 8:
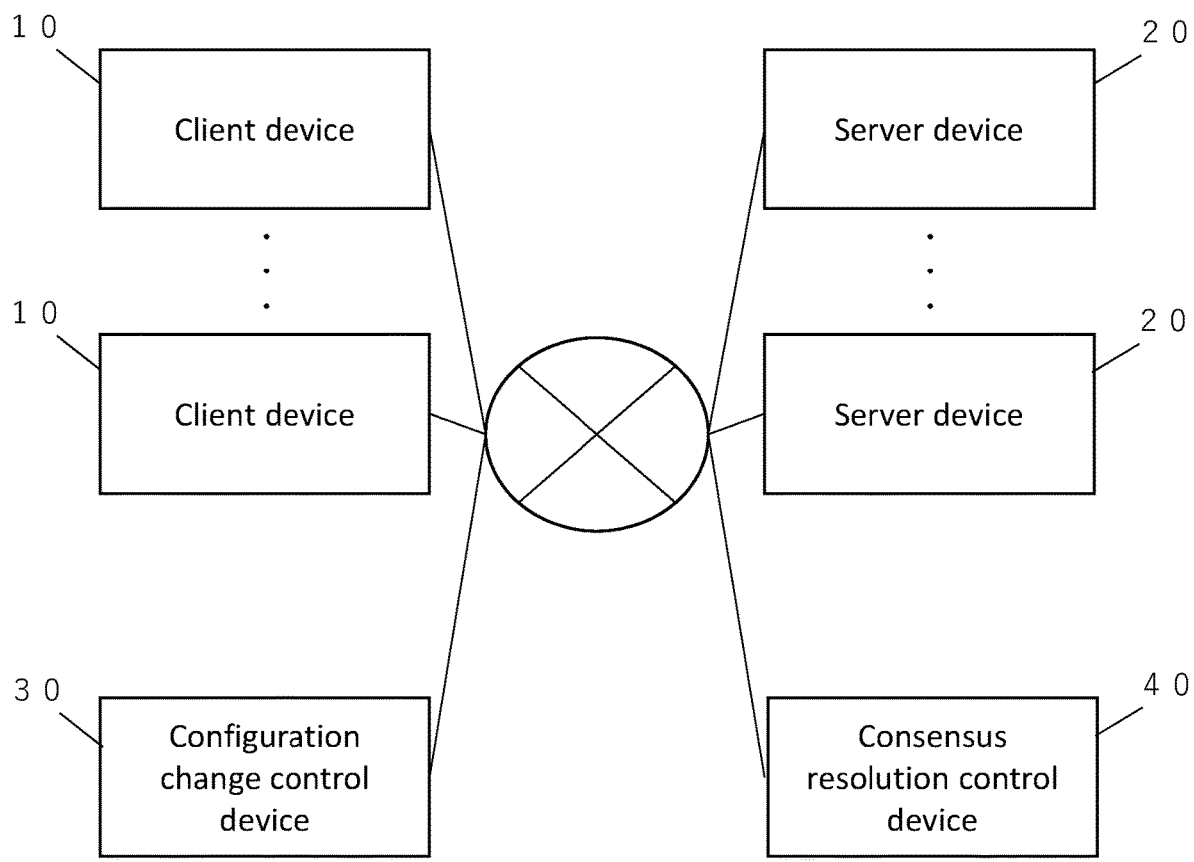
FIG. 8 is a block diagram of a total order broadcast system according to a second embodiment.

FIG. 8 is a block diagram of the total order broadcast system according to the second embodiment.

Referring to FIG. 8, the total order broadcast system includes a client device 10, a server device 20, a configuration change control device 30, and a consensus resolution control device 40.

The consensus resolution control device 40 collects consensus information including data for which the consensus has been confirmed and information on the input clock time from the plurality of server devices 20, and transmits the consensus information obtained from the most server devices 20 by majority vote to the server device 20. As a result, the result of the consensus by majority vote is provided as consensus information to the server device 20 for which the consensus could not be confirmed, so that broadcast can be performed.

The server device 20 of the present embodiment uses the consensus information received from the consensus resolution control device 40 when the consensus could be confirmed by itself, and broadcasts the data included in the consensus information in the order of the input clock time included in the consensus information.

In the present embodiment, the configuration change control device 30 causes the consensus resolution control device 40 to collect the pieces of the consensus information including the input clock time information and the configuration change request for which consensus could be confirmed similarly to the processing on the data and to transmit the pieces of the consensus information obtained from the largest number of server devices 20 to the plurality of server devices 20. Further, the configuration change control device 30 of the present embodiment causes the server device 20 to operate on the basis of the configuration change request and the input clock time included in the consensus information received from the consensus resolution control device 40 when it could not confirm consensus on the configuration change from the client device 10 that has received the input of the configuration change request. As a result, the configuration change request can be supplemented in the same manner as the data, and the configuration change request and the input clock time can be supplemented when the consensus could not be confirmed by the server device 20.

Third Embodiment

In the third embodiment, a total order broadcast system in which the consensus resolution control device receives the data notification from the client device 10 and transmits the data to the plurality of server devices 20 in the order of the input clock time will be described.

The total order broadcast system of the present embodiment includes a consensus resolution control device 40 in addition to the client device 10, the server device 20, and the configuration change control device 30 similarly to the total order broadcast system of the second embodiment illustrated in FIG. 8. The consensus resolution control device 40 of the present embodiment is a device that relays and transmits a data notification between the client device 10 and the server device 20.

In the total order broadcast system of the present embodiment, the client device 10 sends the data notification including the data and the input clock time to the consensus resolution control device 40 rather than sending the same directly to the server device 20, so that data is transmitted to the server device 20 in the order of the input clock time. The consensus resolution control device 40 receives the data notification from the client device 10 and transmits the data to the server device 20 in the order of the input clock time.

In the present embodiment, when the configuration change is performed, the configuration change control device 30 sends a request notification including a configuration change request and an input clock time to the consensus resolution control device 40 instead of the client device 10. The consensus resolution control device 40 sends the configuration change request to the client device 10 in the order of the input clock time in the process similar to the process for the data notification. As a result, in a configuration in which the consensus resolution control device 40 transmits a data notification in the order of input clock time between the client device 10 and the server device 20, the consensus of the plurality of server devices 20 can be confirmed for the configuration change request and the configuration change request can be transmitted to the server device 20 in the order of input clock time.

Further, in the present embodiment, the consensus resolution control device 40 monitors a failure of a plurality of client devices 10, and if there is a failed client device 10, an empty notification is sent to the server device 20 on behalf of the failed client device 10. As a result, total order broadcast can be maintained even when a failure occurs in the client device 10.

The embodiments of the present invention described above are examples for explaining the present invention, and the scope of the present invention is not limited to those embodiments. One of ordinary skill in the art can implement the present invention in various other forms without departing from the scope of the present invention.

What is claimed is:

1. A computer system that performs total order broadcast, comprising:
    one or more input units configured to receive input of data and measure an input clock time at which the input of the data is received;
    a plurality of storage units configured to receive the data from the input units and broadcast the data to a predetermined processing device in the order of the input clock time; and
    a configuration change control device configured to control configuration change of the computer system, for adding an input unit to the computer system, wherein
    upon receiving the input of the data, the input unit transmits a time notification including the input clock time to another input unit and transmits a data notification including the data and the input clock time to the storage unit, and upon receiving the clock time notification of an input clock time from another input unit, the input unit transmits an empty notification including the input clock time to the storage unit, the empty notification indicating that there is no input to the input unit at a clock time earlier than the input clock time,
    upon receiving the data notification from an input unit having received the input of the data and receiving the empty notification from the other input unit, the storage unit broadcasts the data in the order of the input clock time, assuming that consensus of the plurality of storage units is confirmed, and
    when performing configuration change for adding an input unit to the computer system, the configuration change control device causes the storage unit to start confirming the consensus including a joining input unit which is an input unit to be added in the configuration change after a window interval of a predetermined time period has elapsed after the joining input unit starts operation.

2. The computer system according to claim 1, wherein
    the configuration change control device inputs a configuration change request for requesting the storage unit to perform the configuration change to the input unit,
    upon receiving the input of the configuration change request, the input unit transmits a clock time notification including an input clock time at which the configuration change request is received to another input unit and transmits a request notification including the configuration change request and the input clock time to the storage unit, and upon receiving a clock time notification of an input clock time from another input unit, the input unit transmits an empty notification including the input clock time to the storage unit, the empty notification indicating that there is no input to the input unit at a clock time earlier than the input clock time, and
    upon receiving the request notification from an input unit having received the input of the configuration change request and receiving the empty notification from the other input unit, the storage unit starts confirming consensus including the joining input unit after the window interval has elapsed on the basis of the configuration change request, assuming that consensus of the plurality of storage units is confirmed.

3. The computer system according to claim 1, wherein the configuration change control device stores history information recording a time period required until consensus on the data is confirmed by the storage unit after the data is input to the input unit when the data is total-order-broadcasted and determines the time period of the window interval on the basis of the history information.

4. The computer system according to claim 2, wherein
    the configuration change control device inputs information on the window interval as well as the configuration change request to the input unit,
    upon receiving the input of the configuration change request and the window interval, the input unit transmits a clock time notification including an input clock time at which the configuration change request and the window interval are received to another input unit, and transmits a request notification including the configuration change request, the window interval, and the input clock time to the storage unit, and upon receiving a clock time notification of an input clock time from another input unit, the input unit transmits an empty notification including the input clock time to the storage unit, the empty notification indicating that there is no input to the input unit at a clock time earlier than the input clock time, and
    upon receiving the request notification from an input unit having received the input of the configuration change request and the window interval and receiving the empty notification from the other input unit, the storage unit starts confirming consensus including the joining input unit after the window interval has elapsed on the basis of the configuration change request, assuming that consensus of the plurality of storage units can be confirmed.

5. The computer system according to claim 1, wherein, when the configuration change is performed, the configuration change control device causes the joining input unit to start an operation of transmitting an empty notification of an input clock time to the storage unit, the empty notification indicating that there is no input to the joining input unit at a clock time earlier than the input clock time upon receiving a clock time notification of the input clock time from another input unit and causes the joining input unit to start an operation of receiving the input of the data when the window interval has elapsed.

6. The computer system according to claim 2, further comprising:
a consensus resolution control device configured to collect consensus information including information on data and an input clock time for which the consensus could be confirmed from the plurality of storage units and transmit the consensus information obtained from the most storage units to the plurality of storage units, wherein
the storage unit broadcasts the data included in the consensus information received from the consensus resolution control device in the order of the input clock time included in the consensus information when the storage unit could not confirm the consensus by itself,
the configuration change control device causes the consensus resolution control device to collect consensus information including a consensus resolution control device and the input clock time information for which the consensus could not be confirmed and transmit the consensus information obtained from the most storage units to the plurality of storage units, and
the configuration change control device causes the storage unit to operate on the basis of the configuration change request and the input clock time included in the consensus information received from the consensus resolution control device when consensus on the configuration change from the input unit having received the input of the configuration change request could not be confirmed.

7. The computer system according to claim 2, further comprising:
a consensus resolution control device configured to receive a data notification including data and an input clock time and transmit the data notification to the storage unit in the order of the input clock time, wherein
the input unit transmits the data to the storage unit in the order of the input clock time by transmitting a data notification including the data and the input clock time to the consensus resolution control device,
when performing the configuration change, the configuration change control device transmits a request notification including the configuration change request and the input clock time to the consensus resolution control device, and
the consensus resolution control device transmits the data notification and the configuration change request to the storage unit in the order of the input clock time.

8. The computer system according to claim 7, wherein the consensus resolution control device monitors a failure of the input unit and transmits the empty notification to the storage unit on behalf of a failed input unit when the failed input unit is present.

9. A configuration change control device in a computer system including:
one or more input units configured to receive input of data and measure an input clock time at which the input of the data is received;
a plurality of storage units configured to receive the data from the input units and broadcast the data to a predetermined processing device in the order of the input clock time; and
a configuration change control device configured to control configuration change of the computer system, for adding an input unit to the computer system,
upon receiving the input of the data, the input unit transmitting a clock time notification including the input clock time to another input unit and transmitting a data notification including the data and the input clock time to the storage unit, and upon receiving the clock time notification of an input clock time from another input unit, the input unit transmitting an empty notification including the input clock time to the storage unit, the empty notification indicating that there is no input to the input unit at a clock time earlier than the input clock time, and
upon receiving the data notification from an input unit having received the input of the data and receiving the empty notification from the other input unit, the storage unit broadcasting the data in the order of the input clock time, assuming that consensus of the plurality of storage units can be confirmed, the configuration change control device comprising:
a configuration change information management unit configured to manage a window interval of a predetermined time period; and
a configuration change control unit configured to, when performing configuration change for adding an input unit to the computer system, cause the storage unit to start confirming the consensus including a joining input unit after a window interval of a predetermined time period has elapsed after the joining input unit which is an input unit to be added in the configuration change starts operation.

10. A configuration change control method in a computer system that performs total order broadcast, the computer system including:
one or more input units configured to receive input of data and measure an input clock time at which the input of the data is received;
a plurality of storage units configured to receive the data from the input units and broadcast the data to a predetermined processing device in the order of the input clock time; and
a configuration change control device configured to control configuration change for adding an input unit, the configuration change control method comprising:
allowing, upon receiving the input of the data, the input unit to transmit a clock time notification the input clock time to another input unit and transmit a data notification including the data and the input clock time to the storage unit, and upon receiving the clock time notification of an input clock time from another input unit, the input unit to transmit an empty notification including the input clock time to the storage unit, the empty notification indicating that there is no input to the input unit at a time earlier than the input clock time,
allowing, upon receiving the data notification from an input unit having received the input of the data and receiving the empty notification from the other input unit, the storage unit to broadcast the data in the order of the input clock time, assuming that consensus of the plurality of storage units can be confirmed, and
allowing, when performing configuration change for adding an input unit to the computer system, the configuration change control device to cause the storage unit to start confirming the consensus including a joining input unit after a window interval of a predetermined time period has elapsed after the joining input unit which is an input unit to be added in the configuration change starts operation.

\* \* \* \* \*